(12) United States Patent
Ueda et al.

(10) Patent No.: US 7,915,554 B2
(45) Date of Patent: Mar. 29, 2011

(54) DISPLAY UNIT

(75) Inventors: Takashi Ueda, Osaka (JP); Takahiro Okamoto, Osaka (JP)

(73) Assignee: Cateye Co., Ltd., Osaka (JP)

( * ) Notice: Subject to any disclaimer, the term of this patent is extended or adjusted under 35 U.S.C. 154(b) by 0 days.

(21) Appl. No.: 11/652,987

(22) Filed: Jan. 12, 2007

(65) Prior Publication Data

US 2007/0170338 A1   Jul. 26, 2007

(30) Foreign Application Priority Data

Jan. 20, 2006 (JP) ................................. 2006-012393

(51) Int. Cl.
*H01H 9/00* (2006.01)

(52) U.S. Cl. .......... 200/315; 200/5 R; 324/180; 324/168

(58) Field of Classification Search ............... 248/309.1, 248/214, 230.1, 291.1, 292.11; 200/5 R, 200/18, 315; 324/180, 168, 165, 160, 162, 324/163, 164
See application file for complete search history.

(56) References Cited

U.S. PATENT DOCUMENTS

| | | | |
|---|---|---|---|
| 4,479,693 A * | 10/1984 | Uyeda et al. ................... | 439/527 |
| 4,638,448 A | 1/1987 | Cuvelier et al. | |
| 5,771,207 A | 6/1998 | Muroi et al. | |
| 5,804,780 A | 9/1998 | Bartha | |
| 6,462,292 B1 * | 10/2002 | Wang ............................. | 200/315 |
| 6,631,656 B2 * | 10/2003 | Ase et al. ...................... | 74/551.8 |
| 6,734,376 B2 * | 5/2004 | Ichida et al. .................... | 200/4 |
| 2001/0040204 A1 * | 11/2001 | Irie ............................. | 248/230.1 |
| 2006/0261593 A1 | 11/2006 | Okuda et al. .................. | 285/252 |

FOREIGN PATENT DOCUMENTS

| | | |
|---|---|---|
| CN | 1700159 A | 11/2005 |
| CN | 1541885 A | 12/2007 |
| DE | 10063385 A1 | 6/2001 |
| EP | 0887252 A2 | 12/1998 |
| EP | 1375325 A2 | 1/2004 |
| EP | 1463013 A2 | 9/2004 |
| EP | 1595777 A2 | 11/2005 |
| JP | 55-096482 A | 1/1979 |
| JP | 02-135488 A | 5/1990 |
| JP | 04-104088 U | 9/1992 |
| JP | 05-036888 B | 6/1993 |
| JP | 07-076291 A | 3/1995 |
| JP | 08-113175 A | 5/1996 |
| JP | 10-035566 A | 2/1998 |
| JP | 10-218061 A | 8/1998 |
| JP | 10-218076 A | 8/1998 |

(Continued)

OTHER PUBLICATIONS

Homepage of Planet Bike (Browsed on Jan. 13, 2006) on the Internet <URL: http://www.Planetbike.com/computers.html>.

(Continued)

*Primary Examiner* — Alfred Joseph Wujciak, III

(74) *Attorney, Agent, or Firm* — Olson & Cepuritis, Ltd.

(57) ABSTRACT

A display unit, attached to a bar forming a handlebar, frame or stem of a bicycle with a securing tool, comprises a body having a display part capable of realizing a first display state displaying first data (traveling speed, for example) and a second state displaying second data (traveling distance, for example). The first and second display states are switched by pressing down body from above.

6 Claims, 7 Drawing Sheets

FOREIGN PATENT DOCUMENTS

| | | | |
|---|---|---|---|
| JP | 2926349 | B | 5/1999 |
| JP | 2000-016367 | A | 1/2000 |
| JP | 2001-059739 | A | 3/2001 |
| JP | 2001-187593 | A | 7/2001 |
| JP | 2001-270487 | A | 10/2001 |
| JP | 2003-252271 | A | 9/2003 |
| JP | 2004-249885 | A | 9/2004 |
| JP | 2004-256047 | A | 9/2004 |
| JP | 3598365 | B | 9/2004 |
| JP | 2005-324786 | A | 5/2005 |
| JP | 2005-153596 | A | 6/2005 |
| JP | 2005-225426 | A | 8/2005 |
| JP | 2005-350064 | A | 12/2005 |
| JP | 02-135488 | A | 9/2008 |

OTHER PUBLICATIONS

For JP-2005-153596A see Patent Application Publication US2005/0109808A1.

For JP2004-249885A see Patent Application Publication US2004/0163479A1.

For JP08-113175A see Patent US5,735,441.

"Protege 8.0 and 9.0 Instructions". Defendant's Exhibit No. 3-1-1 in the Japanese proceeding (2. pp).

"Planet Bike Protege 8.0 and 9.0 Cyclocomputer". Defendant's Exhibit No. 3-2-1 in the Japanese proceeding (25. pp).

"Photographs of Protege 8.0" Manufactured by Planet Bike. Defendant's Exhibit No. 3-3 in the Japanese proceeding, with English translation (7. pp).

"Photographs of Protege 9.0" Manufactured by Planet Bike. Defendant's Exhibit No. 3-4 in the Japanese proceeding, with English translation (12. pp).

"Illustrated Description of IPC—Electrical Switches"—Mar. 1988 (pp. 1-27), Japan Patent Office, English translation of bibliographic information.

Kaname Shoji, Limit Switches—1996 (pp. 142-143), Nikkan Kogyo Shinbun Ltd., English translation of bibliographic information.

"Basic Knowledge of Control Equipment . . . " ( Aug. 2001 (pp. 169-172), Nippon Electric Control Equipment Industries Assoc., English translation of bibliographic information.

* cited by examiner

DISPLAY UNIT

BACKGROUND OF THE INVENTION

1. Field of the Invention

The present invention relates to a display unit, and more particularly, it relates to a display unit capable of switching a plurality of display states.

2. Description of the Background Art

A display unit, attached to a bar, capable of displaying various data is known in general.

For example, Japanese Patent Laying-Open No. 2005-350064 discloses a display unit for a bicycle comprising a bracket attachable to the frame of the bicycle, a display part and a control part. The control part changes at least one of the three attributes of color, i.e. the hue, the chroma and the brightness of the backlight in response to received data.

A display unit displaying a plurality of different data on a display part thereof may display only part of the data on the display part and switch the display state for displaying the remaining data, in order to effectively utilize the limited area of the display part. Such a display unit is described on the homepage of Planet Bike (browsed on Jan. 13, 2006) on the Internet <URL: http://www.planetbike.com/computers.html>, for example.

Considering improvement in the operability for switching the display state on such a display unit, a changeover switch for the display state is preferably provided on the upper surface of the display unit, so that the display state is switched by pressing down the switch from above. When the changeover switch is provided on the upper surface of the display unit, however, the display area of the display part is disadvantageously reduced.

SUMMARY OF THE INVENTION

An object of the present invention is to provide a display unit improved in operability while an adequate display area is ensured.

The display unit according to the present invention, attached to a bar, comprises a body having a display part capable of realizing a first display state displaying first data and a second display state displaying second data, while the first and second display states are switched by pressing down the body from above.

According to this structure, the operability for switching the display state can be improved while reduction in the area of the display part is prevented.

Preferably, the aforementioned display unit further comprises a securing tool for securing the body to the bar, the body is rotatably supported on the securing tool, and a changeover switch for switching the first and second display states is so provided as to protrude from a surface of the body opposite to the securing tool.

According to this structure, the body is pressed against the securing tool for pushing up the changeover switch, thereby switching the display state. Thus, the operability for switching the display state can be improved while reduction in the area of the display part is prevented.

According to an aspect of the present invention, the center of gravity of the display unit is opposite to the changeover switch with respect to a fulcrum supporting the body.

According to another aspect of the present invention, the aforementioned display unit further comprises a storage mechanism storing electric power for displaying data on the display part. The center of gravity of the storage mechanism is opposite to the changeover switch with respect to a fulcrum supporting the body.

Thus, the changeover switch can be prevented from a false operation resulting from vertical vibration according to either aspect.

In the aforementioned display unit, the bar is a handlebar, frame or stem of a two-wheeler, for example.

When the rider of the two-wheeler wears gloves, it is difficult to operate a small changeover switch in particular. According to the aforementioned display unit, the rider can switch the display state by pressing a wide surface of the body, whereby a remarkable effect can be achieved in operability.

According to the present invention, as hereinabove described, a display unit improved in operability can be provided while an adequate display area is ensured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
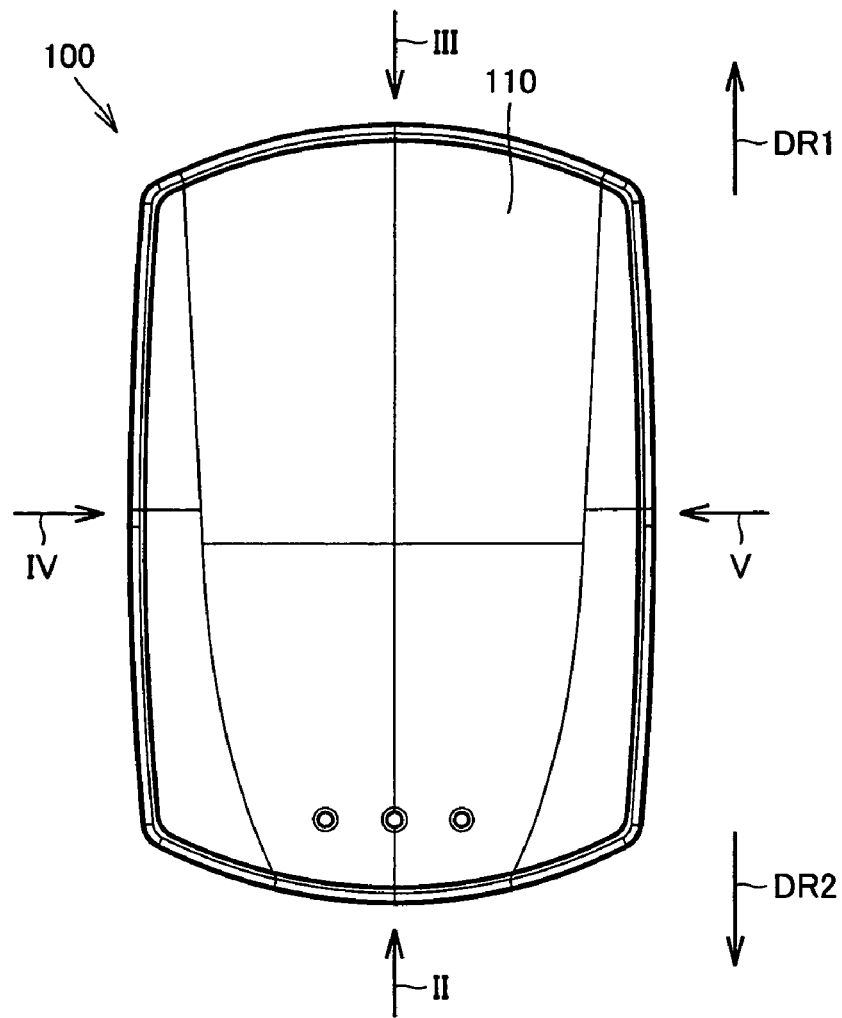
FIG. 1 is a top plan view of a body of a display unit according to an embodiment of the present invention.
Figure 2:
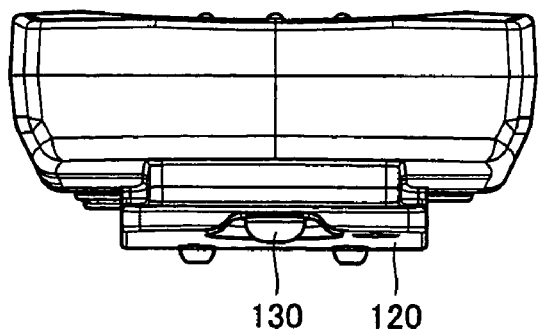
FIGS. 2 to 5 illustrate the body shown in FIG. 1 as viewed along arrows II, III, IV and V respectively.
Figure 3:
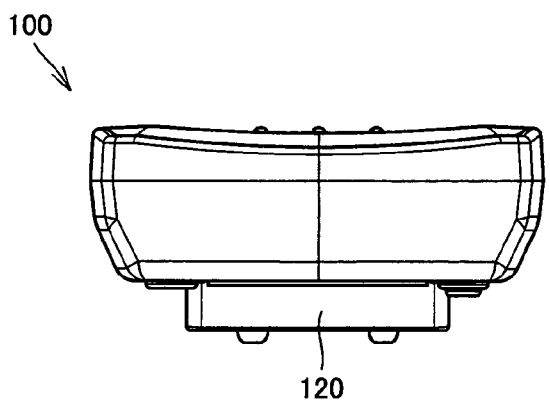

An embodiment of a display unit according to the present invention is now described. Identical or corresponding portions are denoted by the same reference numerals, and redundant description may not be repeated.

Referring to FIGS. 1 to 5, a body 100 according to this embodiment includes a display part 110 displaying various data, an engaging part 120 engaging with a securing tool, a rubber button 130 which is so provided as to protrude from the bottom surface of body 100, a tact switch 140 provided on rubber button 130 and a battery 150.

Figure 4:
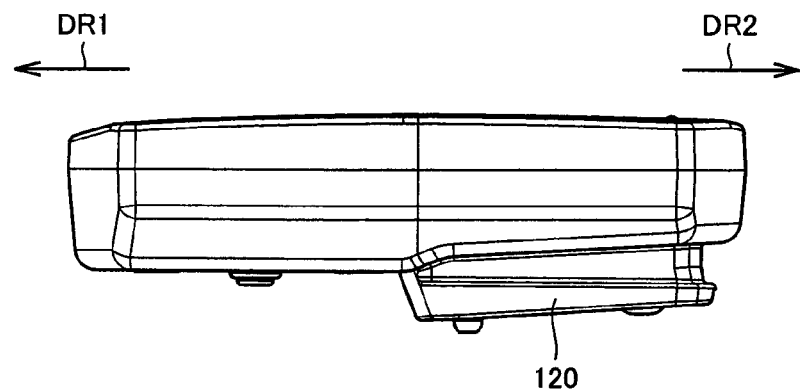
Figure 5:
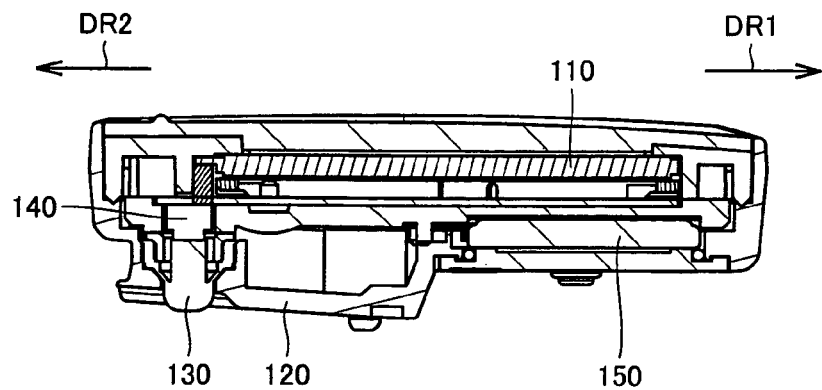

Body 100 is attached to a handlebar, frame or stem of a bicycle, for example. Referring to FIGS. 1, 4 and 5, arrows DR1 and DR2 correspond to the front and rear sides of the bicycle respectively. Display part 110 displays a plurality of data such as the traveling speed, the traveling time, the travel distance, the time of day, the average speed and the maximum speed of the bicycle, for example. Display part 110 does not simultaneously display these data. In other words, display part 110 realizes a "first display state" displaying part of the aforementioned plurality of data and a "second display state" displaying the remaining data. The number of the display states is not restricted to two, but display part 110 can realize an arbitrary number of display states. When rubber button 130 is pushed toward an inward portion of body 100, tact switch 140 is pressed, and the display state is switched. The rider of the bicycle can successively confirm the various data by successive switching of the display state. Battery 150 is arranged on a position shifted along arrow DR1 from (front side of) the longitudinal center of body 100.

Figure 6:
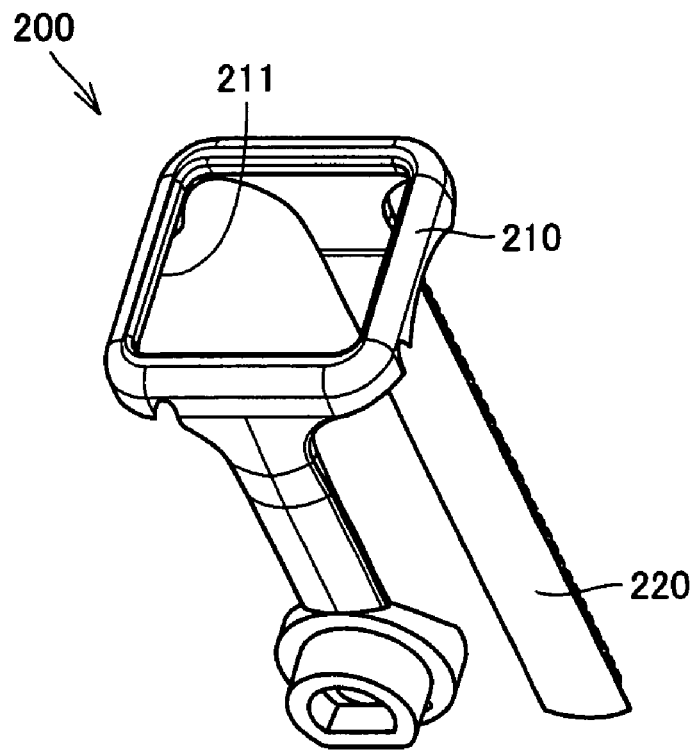
FIG. 6 is a perspective view showing a securing tool for securing the body of the display unit shown in FIGS. 1 to 5 to a bar.
Figure 7:
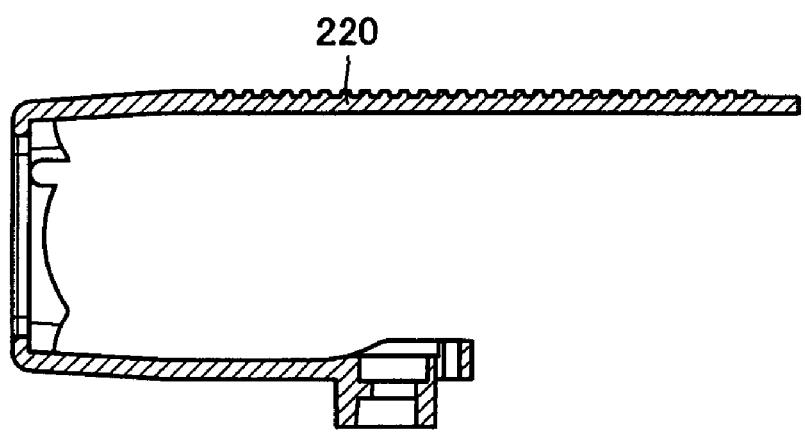
FIG. 7 is a side sectional view of the securing tool shown in FIG. 6.
Figure 8:
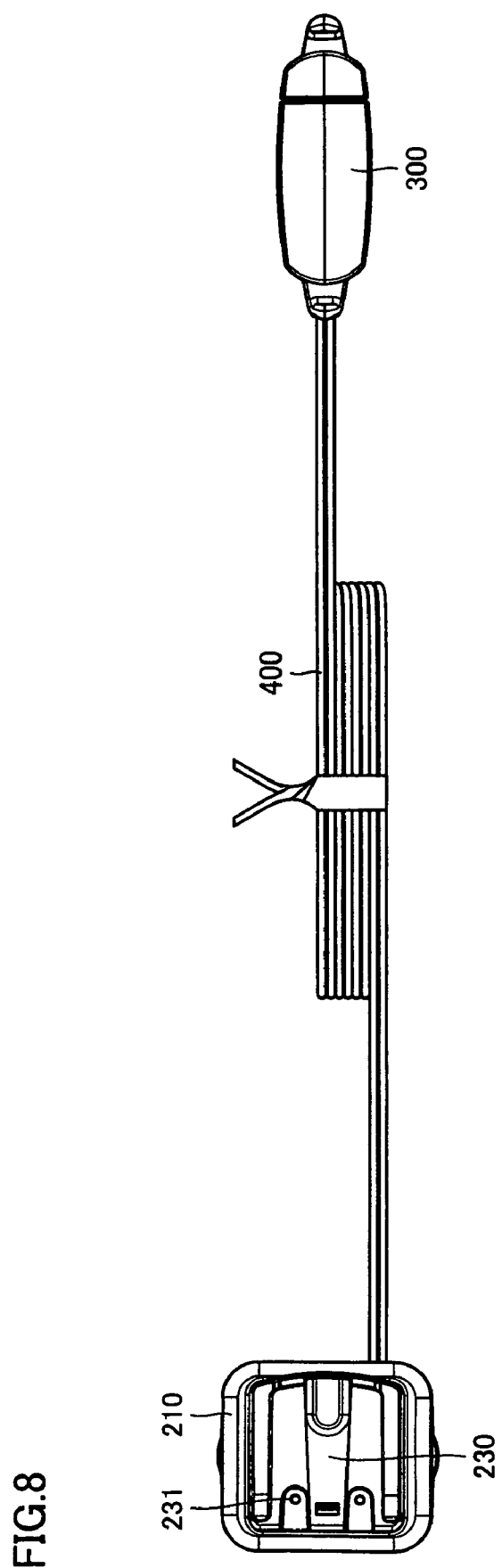
FIG. 8 illustrates a sensor attached to the securing tool shown in FIGS. 6 and 7.

Referring to FIGS. 6 to 8, a securing tool 200 includes a securing tool body 210, a band 220 wound on a handlebar or the like and a fit member 230. Securing tool body 210 has an opening 211. Fit member 230 is fitted into opening 211, to be integrated with securing tool body 210. Opening 211 and fit member 230 are substantially squared, and fit member 230 can be attached to opening 211 also in a state rotated by 90° from that shown in FIG. 8. One end of a cable 400 is connected to fit member 230. Another end of cable 400 is connected to a sensor (speed sensor, for example) 300. Data fetched from sensor 300 is transmitted to fit member 230 through cable 400. Body 100 fetches this data through an electrode 231 of fit member 230, and displays the data on display part 110.

Figure 9:
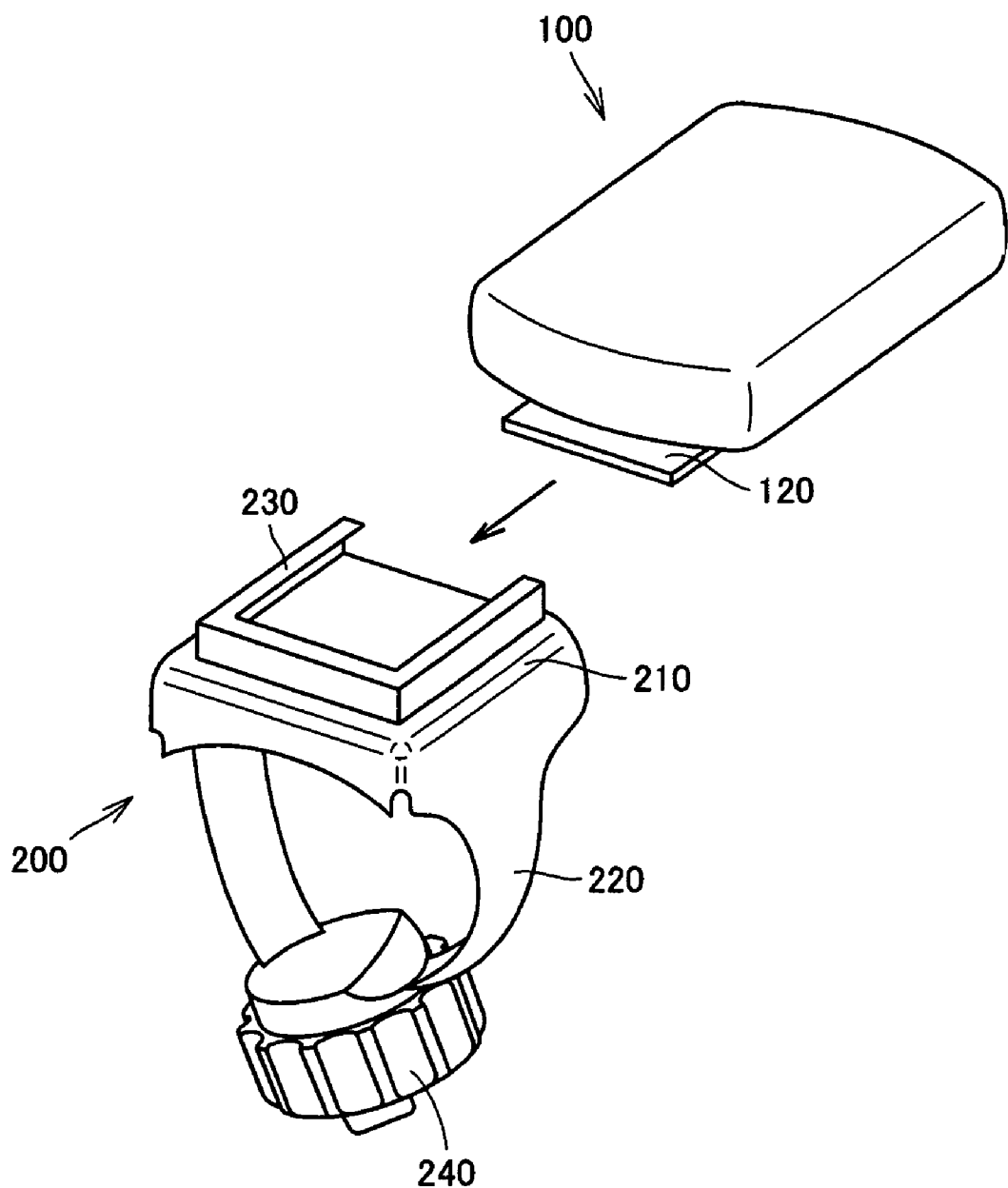
FIG. 9 illustrates a state of attaching the body of the display unit to the securing tool shown in FIGS. 6 and 7.
Figure 10:
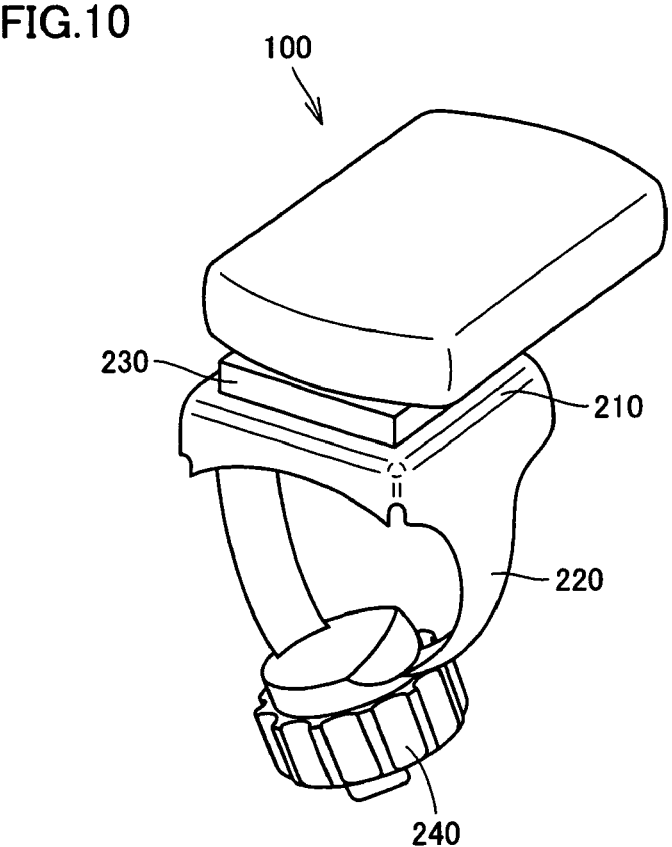
FIG. 10 illustrates a state after attaching the body of the display unit to the securing tool shown in FIGS. 6 and 7.

FIG. 9 illustrates a state of attaching body 100 to securing tool 200. FIG. 10 illustrates a state after attaching body 100 to securing tool 200.

Referring to FIGS. 9 and 10, body 100 is slid along arrow in FIG. 9, so that engaging part 120 of body 100 engages with fit member 230 of securing tool 200. Thus, body 100 is attached to securing tool 200. As shown in FIGS. 9 and 10, securing tool 200 is a worm-gear type securing tool having a rotational operating part 240. In other words, band 220 can be tightened or loosened by rotating rotational operating part 240.

Figure 11:
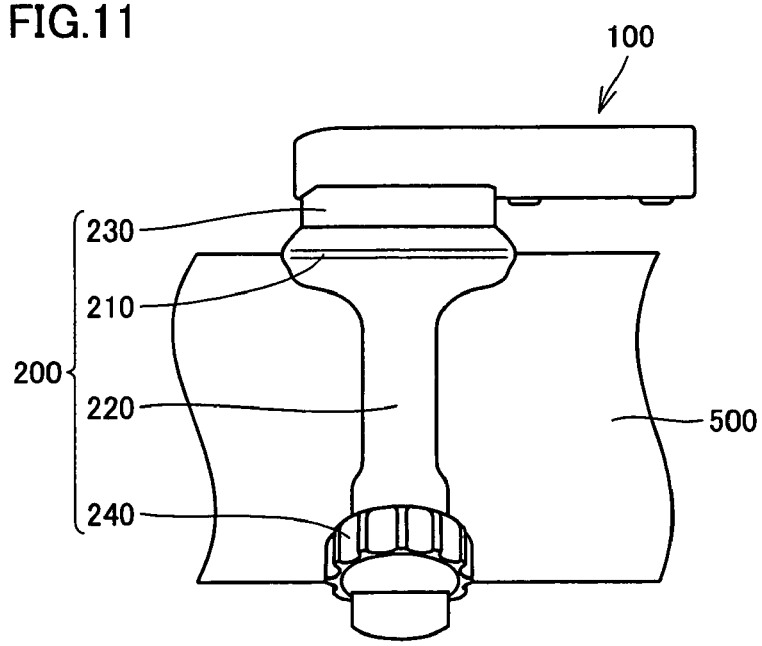
FIG. 11 illustrates the display unit according to the embodiment of the present invention attached to a bar.

FIG. 11 illustrates a display unit, including body 100 and securing tool 200, attached to a bar 500. As shown in FIG. 11, the display unit is attached to bar 500 by winding band 220 of securing tool 200 on bar 500 and clamping bar 500. The display unit, attached to bar (stem, for example) 500 extending along the longitudinal direction of the bicycle in FIG. 11, can alternatively be attached to another bar (handlebar, for example) extending along the horizontal direction of the bicycle by attaching fit member 230 to securing tool body 210 in the state rotated by 90°, as hereinabove described.

Figure 12:
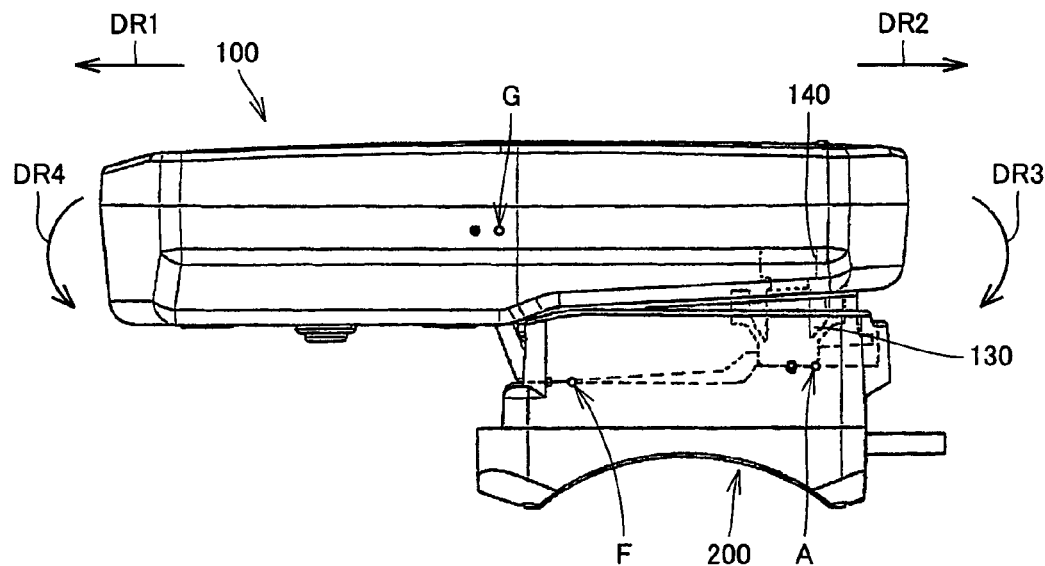
FIG. 12 is a diagram for illustrating the position of the center of gravity of the display unit according to the embodiment of the present invention.

The position of the center of gravity of the aforementioned display unit is now described with reference to FIG. 12. Referring to FIG. 12, body 100 is rotatably supported on securing tool 200. In other words, body 100 is rotatable along arrows DR3 and DR4. In order to switch the display state, an end (rear end) of body 100 along arrow DR2 is pressed down. Thus, body 100 rotates along arrow DR3 to push rubber button 130 into body 100 with securing tool 200, thereby working tact switch 140.

As shown in FIG. 12, in the display unit according to this embodiment, the center of gravity G of the display unit, a fulcrum F supporting body 100 and a switch working position A line up in this order from the forward end of the bicycle along the longitudinal direction of the bicycle (directions of arrows DR1 and DR2). Thus, moment by the gravity acts on body 100 along arrow DR4, to cancel moment along arrow DR3. Therefore, body 100 can be prevented from rotating along arrow DR3 due to vertical vibration and causing a false operation of the display changeover switch in a traveling state of the bicycle. Center of gravity G of the display unit can be adjusted by arrangement of battery 150, for example. According to this embodiment, battery 150 is arranged frontward beyond fulcrum F supporting body 100, thereby shifting center of gravity G frontward.

The hardness (resistance) for pushing rubber button 130 is properly adjusted to a degree for preventing a false operation resulting from vibration while an easy switching operation is allowed.

The inventors have conducted a vibration test for confirming whether or not a false operation in switching the display state can be prevented according to the aforementioned structure. The procedure of this experiment is now described. First, the display unit was inclined at a prescribed angle and placed on a vibrating table. At this time, the display unit was inclined along arrow DR3 or DR4. Then, vertical vibration was applied to the display unit at a prescribed frequency. Acceleration was successively increased for measuring the level of the acceleration for pushing rubber button 130. When rubber button 130 was pushed with excessively small acceleration, the display unit was evaluated as easily causing a false operation. Table 1 shows the results of the aforementioned experiment.

TABLE 1

Acceleration for Switching Display State (unit: G)

| Angle of Inclination | 11.7 Hz | 20 Hz | 30 Hz | 40 Hz | 50 Hz | 60 Hz |
|---|---|---|---|---|---|---|
| 0° | — | — | — | — | — | 32 |
| 5° | — | — | — | — | — | — |
| 10° | — | — | — | — | — | — |
| 15° | — | — | — | — | — | — |
| −10° | — | — | — | — | — | — |
| Maximum Acceleration of Testing Device | 7.0 | 12.5 | 20.0 | 27.5 | 35.0 | 40.0 |

Figure 13:
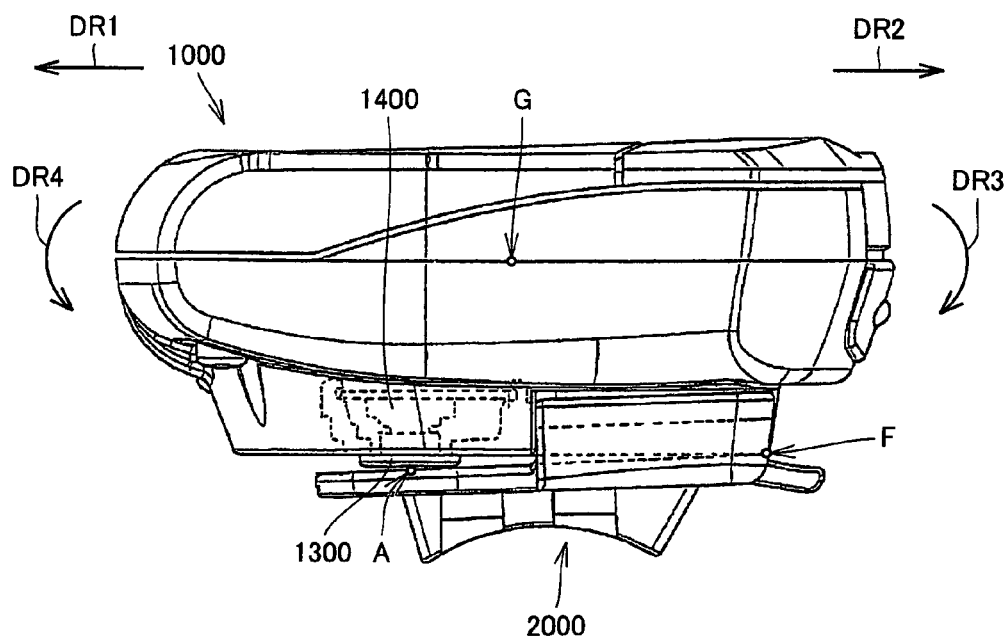
FIG. 13 is a diagram for illustrating the position of the center of gravity of a display unit according to comparative example.

Angle of Inclination: + when inclined along arrow DR3
—: display state not switched upon application of maximum acceleration of testing device The position of the center of gravity of a display unit according to comparative example is now described with reference to FIG. 13. Referring to FIG. 13, in the display unit according to comparative example, a switch working position A, the center of gravity G of the display unit and a fulcrum F supporting a body 1000 line up in this order from the forward end of a bicycle along the longitudinal direction of the bicycle (directions of arrows DR1 and DR2). Thus, moment by the gravity acts on body 1000 along arrow DR4. Therefore, body 1000 easily rotates along arrow DR4 due to vertical vibration in a traveling state of the bicycle, thereby a rubber button 1300 is pushed and a tact switch 1400 works. Consequently, a false operation of the display changeover switch occurs.

The inventors have conducted a vibration test similar to the above also on the display unit shown in FIG. 13. Table 2 shows the results of this experiment.

TABLE 2

Acceleration for Switching Display State (unit: G)

| Angle of Inclination | 11.7 Hz | 20 Hz | 30 Hz | 40 Hz | 50 Hz | 60 Hz |
|---|---|---|---|---|---|---|
| 0° | — | — | 15.6 | 17.8 | 14.3 | 14.0 |
| 5° | — | — | 16.7 | 14.7 | 12.6 | 12.5 |
| 10° | — | — | 19.5 | 13.6 | 13.0 | 11.6 |

TABLE 2-continued

Acceleration for Switching Display State (unit: G)

| Angle of Inclination | 11.7 Hz | 20 Hz | 30 Hz | 40 Hz | 50 Hz | 60 Hz |
|---|---|---|---|---|---|---|
| 15° | — | — | 20.0 | 20.0 | 16.5 | 13.5 |
| −10° | — | — | — | 23.3 | 22.4 | 18.4 |
| Maximum Acceleration of Testing Device | 7.0 | 12.5 | 20.0 | 27.5 | 35.0 | 40.0 |

Angle of Inclination: + when inclined along arrow DR3
—: display state not switched upon application of maximum acceleration of testing device As understood from Tables 1 and 2, rubber button 130 was pushed with acceleration of 32 G in the display unit according to this embodiment, only when the angle of attachment of the display unit was 0° and the vibrational frequency was 60 Hz. Under the remaining conditions, rubber button 130 was not pushed even when the acceleration was increased to the upper limit of a vibration testing device. In the display unit according to comparative example, on the other hand, rubber button 1300 was pushed to switch the display state under various conditions. From the results shown in Tables 1 and 2, it can be understood that the display unit according to this embodiment sufficiently suppresses a false operation resulting from vibration in a traveling state of the bicycle as compared with the display unit according to comparative example.

The aforementioned contents are summarized as follows: The display unit according to this embodiment, attached to bar 500, comprises body 100 having display part 110 capable of realizing a first display state displaying first data (traveling speed, for example) and a second display state displaying second data (traveling distance, for example). The first and second display states are switched by pressing down body 100 from above. The aforementioned display unit further comprises securing tool 200 for securing body 100 to bar 500. Body 100 is supported on securing tool 200 to be rotatable along arrows DR3 and DR4. Rubber button 130 is provided as a "changeover switch" for switching the first and second display states, to protrude from the surface (bottom surface) of display body 100 opposite to securing tool 200. When rubber button 130 is pushed into body 100, tact switch 140 operates to switch the display state.

Center of gravity G of the aforementioned display unit is opposite to rubber button 130 with respect to fulcrum F supporting body 100. The aforementioned display unit further comprises battery 150 serving as a "storage mechanism" storing electric power for displaying data on display part 110. The center of gravity of battery 150 is opposite to rubber button 130 with respect to fulcrum F supporting body 100.

In the display unit according to this embodiment, the operability for switching the display state can be improved while reduction of the area of display part 110 is prevented. When the rider of the bicycle wears gloves, it is difficult to operate a small changeover switch in particular. According to the aforementioned display unit, the rider of the bicycle can switch the display state by pressing the wide surface of body 100, whereby a remarkable effect can be attained in operability.

While bar 500 is a handlebar, frame or stem of a two-wheeler in the above description, the display unit according to this embodiment is attachable to an arbitrary bar member.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display unit attached to a bar for realizing a change from one display state to another display state comprising:
    a body having an upper side, a lower side, a display part on said upper side, and a storage mechanism storing electric power for displaying data;
    a securing tool for mounting said body to said bar, and
    a control switch on said body for changing from said one display state to said other display state, wherein
    said body as a whole can be integrally tilted on said securing tool,
    a first information fetched by said body can be displayed on said display part in said one display state, a second information can be displayed on said display part in said other display state, and
    said change is caused by pressing down and tilting integrally said body as a whole on said securing tool, and thereby pushing said control switch, which protrudes from said lower side of said body toward said securing tool.

2. The display unit according to claim 1, wherein said bar is a handlebar, frame or stem of a two wheeler vehicle.

3. The display unit according to claim 1, wherein said body is attached to a bicycle, and said first information includes a traveling speed of said bicycle.

4. The display unit according to claim 1, wherein the display unit has a center of gravity, said securing tool having a fulcrum supporting said body, and said center of gravity, said fulcrum, and said control switch are aligned longitudinally in this order.

5. The display unit according to claim 1, wherein, said storage mechanism has a center of gravity, said securing tool has a fulcrum, and said center of gravity, said fulcrum, and said control switch are aligned longitudinally in this order.

6. A display unit adapted to be attached to a bar of a bicycle for realizing a change from one display state to another display state comprising:
    a body having an upper side, a lower side, a display part on said upper side, and a storage mechanism storing electric power for displaying data;
    a securing tool for mounting said body to said bar of said bicycle, and
    a control switch on said body for changing from said one display state to said other display state, wherein
    said body as a whole can be integrally tilted on said securing tool,
    a first information fetched by said body can be displayed on said display part in said one display state, said first information including the traveling speed of the bicycle,
    a second information can be displayed on said display part in said other display state, and
    said change is caused by pressing down and tilting integrally said body as a whole on said securing tool, and thereby pushing said control switch, which protrudes from said lower side of said body toward said securing tool, said display unit having a center of gravity, said securing tool having a fulcrum supporting said body, and said center of gravity, said fulcrum, and said control switch being aligned longitudinally in this order.

* * * * *